United States Patent [19]
Carroll et al.

[11] Patent Number: 6,031,023
[45] Date of Patent: Feb. 29, 2000

[54] DRY ERASE INK COMPOSITION

[75] Inventors: Clifford C. Carroll, Spartanurg; Michael A. Valenti, Taylors, both of S.C.

[73] Assignee: Milliken & Company, Spartanburg, S.C.

[21] Appl. No.: 08/984,590

[22] Filed: Dec. 3, 1997

[51] Int. Cl.[7] .......................... C09D 11/16; C09D 139/06; C08L 39/06; C08L 71/02
[52] U.S. Cl. ........................ 523/161; 525/185; 525/187
[58] Field of Search ..................... 523/160, 161, 523/164; 525/185, 187; 103/31.01, 31.13, 31.27, 31.32, 31.09, 32.5

[56] References Cited

U.S. PATENT DOCUMENTS

| | | | |
|---|---|---|---|
| 3,157,633 | 11/1964 | Kuhn | 260/200 |
| 3,449,319 | 6/1969 | Kuhn | 260/207.5 |
| 3,563,782 | 2/1971 | Liberman | 117/37 |
| 4,091,034 | 5/1978 | Kuhn | 260/391 |
| 4,097,289 | 6/1978 | Hofmann et al. | 106/26 |
| 4,102,644 | 7/1978 | Hauser et al. | 8/164 |
| 4,144,028 | 3/1979 | Hauser et al. | 8/164 |
| 4,256,492 | 3/1981 | Matsumoto et al. | 106/31.37 |
| 4,256,494 | 3/1981 | Yamamoto et al. | 106/22 |
| 4,578,117 | 3/1986 | Nakanishi | 106/20 |
| 4,654,296 | 3/1987 | Held | 430/525 |
| 4,740,549 | 4/1988 | Okuzono et al. | 524/379 |
| 4,812,141 | 3/1989 | Baumgartner et al. | 8/506 |
| 4,871,371 | 10/1989 | Harris | 8/403 |
| 4,877,411 | 10/1989 | Hines et al. | 8/403 |
| 4,926,190 | 5/1990 | Laver | 347/105 |
| 4,935,461 | 6/1990 | Nakamura | 524/306 |
| 4,954,174 | 9/1990 | Imagawa | 106/31.64 |
| 5,043,013 | 8/1991 | Kluger et al. | 106/22 |
| 5,059,244 | 10/1991 | King et al. | 106/21 |
| 5,099,594 | 3/1992 | Reas et al. | 40/593 |
| 5,130,463 | 7/1992 | Haubennestel et al. | 558/172 |
| 5,310,887 | 5/1994 | Moore et al. | 534/729 |
| 5,316,574 | 5/1994 | Fujita et al. | 106/20 |
| 5,324,764 | 6/1994 | Fujita et al. | 524/377 |
| 5,338,793 | 8/1994 | Loftin | 524/571 |
| 5,382,562 | 1/1995 | Hutten | 503/227 |
| 5,412,021 | 5/1995 | Nakanishi | 524/523 |
| 5,620,943 | 4/1997 | Brendle | 504/116 |
| 5,677,363 | 10/1997 | Imagawa | 523/161 |
| 5,766,268 | 6/1998 | Bruhnke | 8/647 |

FOREIGN PATENT DOCUMENTS 778325  6/1997  European Pat. Off. .

*Primary Examiner*—Vasu Jagannathan
*Assistant Examiner*—Callie E. Shosho
*Attorney, Agent, or Firm*—Terry T. Moyer; William S. Parks

[57] ABSTRACT

Novel white board dry erase ink compositions are provided which are comprised of poly(oxyalkylene) substituted colorants, volatile solvent vehicles, and binder resins. The binder resin is insoluble within the alcohol of the volatile vehicle; however, the degree of alkoxylation on the colorant aids in solubilizing the binder resin within the entire solution. Once the composition is transferred to a white board, the solvent evaporates, leaving the binder resin and colorant as a friable discontinuous film which is easily removed from the writing surface. The inventive composition has improved erasability, writability, stability within the marker stylus, and washability from skin and fabrics. Markers and methods of producing the ink composition are also provided.

55 Claims, No Drawings

DRY ERASE INK COMPOSITION

FIELD OF THE INVENTION

This invention relates to dry erase ink compositions for utilization on white boards comprising specific polymeric colorants and binders. Such ink compositions provide excellent writability, erasability, and storage stability. Methods of utilizing these ink compositions are also contemplated within this invention.

DISCUSSION OF THE PRIOR ART

White boards have long been utilized as chalk board substitutes. U.S. Pat. No. 3,563,782 to Liberman et al. first taught such writing surfaces as well as inks for marking upon these surfaces These ink compositions comprised major proportions of solvent and minor amounts of dye with absolutely no resin binder components present. Further white board references include U.S. Pat. No. 5,382,562 to Hutten which teaches an erasable marker-board and U.S. Pat. No. 5,099,594 to Reas et al. which teaches a mounted display article for storage of white board markers. Such white board writing surfaces, which are made of plastic, enamel, melamine, or polypropylene, generally provide an easier method of displaying or conveying information in a classroom or boardroom setting. In particular, the lack of necessity of chalk as a writing implement for such white boards provides a way of avoiding the problems associated with chalk. For instance, chalk residue is difficult to remove completely from a chalkboard; chalk dust is prevalent on chalk holders and erasers, as well as a user's hands, which can then be transferred to a user's clothes; and so on. With a proper white board marker, a user can avoid these problems. However, other difficulties of writing surface removal and staining of skin and clothes arise with such markers.

White board dry erase markers subsequent to those taught by Liberman et al., above, include inks comprised primarily of pigments or acid dyes. Such formulations are highly staining to skin and fabrics and are difficult to remove from such substrates. These pigment-containing markers also require horizontal storage, such as provided by the Reas et al. patent mentioned above, due to the instability of the solid pigment particles in solution. With long term vertical storage, the pigments would precipitate out of solution and the resultant marker tip would have reduced amounts of colorant. In such an instance the amount of color produced on a white board would be faint or nonexistent. Examples of pigment-containing or acid dye-containing ink compositions for white board markers include U.S. Pat. No. 4,256,494 to Yamamoto et al., U.S. Pat. No. 4,740,549 to Okuzono et al., U.S. Pat. No. 4,935,461 to Nakamura, U.S. Pat. No. 5,316,574 to Fujita et al., U.S. Pat. No. 5,324,764 to Fujita et al., U.S. Pat. No. 5,338,793 to Loftin, and U.S. Pat. No. 5,412,021 to Nakanishi. This horizontal storage requirement is noticed most importantly where a commercial supplier or vendor must keep such a supply in that necessary position. This leads to increased costs in closely tracking the storage of the supply in order to insure maximum performance for the consumer. Also, a vendor must provide a greater amount of shelf space for such horizontally stored markers, again to insure optimum performance at the consumer level. Such a requirement leads to increased costs for either the supplier, who must purchase more shelf space from the vendor, or for the vendor, whose loss of shelf space reduces the amount available for other wares. Furthermore, the high potential for loss of utility for such markers due to the horizontal storage requirement leads to frequent replacement. Consequently, all of these problems translate into higher costs for the consumer.

The present invention does not contain such pigments or acid dyes. The colorants utilized within this invention are in liquid (aqueous) or wax (emulsified) form which is unique to ink compositions for dry erase marking. White boards are impermeable to moisture and, generally, liquids will not easily adhere to such surfaces. The colorants utilized within the prior art are either dissolved dyes or dispersed pigments. Such solutions facilitate adhesion to white boards surfaces however they are difficult to remove completely, particularly after a setting time of long duration. Also of detriment to a user of such pigment-containing markers is, as noted above, their high potential for staining skin and clothing. Although these pigments may be erasable from white boards, such ink compositions are not easily removable, if at all, from fabrics, particularly cotton and polyester/cotton blends.

Further erasable ink compositions are provided by U.S. Pat. No. 4,097,289 to Hofmann et al. and U.S. Pat. No. 4,578,117 to Nakanishi. The Hofmann et al. patent requires organic solvent-soluble, and specifically not water-soluble, base or acid dyestuffs. Such a disclosure teaches away from the present invention. The Nakanishi patent broadly teaches a white board marker formulation comprising oil-soluble or spirit-soluble dyes, most notably pigments; a resin component, exemplified as a polyvinylbutyral or vinylchloride-vinyl acetate copolymer, a specific trimethylolalkane fatty acid ester as a novel separating agent; and a volatile organic solvent, preferably a ketone. Patentee does not discuss any colorants other than pigments which are of utility within this composition. Consequently, there is no discussion of the ability to store such markers vertically or the fugitivity of such ink compositions from any surfaces other than white boards.

It is the object of this invention, therefore, to meet all of the aforementioned problems within the prior art with a novel white board dry erase ink composition. More succinctly, it is an object of this invention to provide a dry erase ink formulation for white board markers which may be stored in any position without any appreciable loss in marking and coloring ability. Also, it is an object of this invention to provide an ink composition which will not become permanently adhered to, and thus is easily erased from, a white board surface after a substantial amount of time. Another object of this invention is to provide an ink composition which is fugitive on skin and fabrics and thus will not permanently stain such substrates. Yet another object of this invention is to provide a white board marker which is free from ketones or other malodorous solvents and thus contains either a pleasant smelling or scent-free ink composition.

Other objects and features of the invention are apparent from the following description thereof.

DESCRIPTION OF THE INVENTION

The dry erase ink composition of the present invention comprises a poly(oxyalkylene) substituted colorant, a volatile solvent vehicle selected from an alcohol or alcohols, water, or both, and a binder resin which is miscible in the presence of both the colorant and the volatile solvent vehicle, and which binds to the surface of a white board as a friable discontinuous film upon evaporation of the vehicle. The composition may optionally comprise release agents, non-fluorinated surfactants, including aminosilicone emulsions, ethoxylated fatty acid esters, and cationic amide oxides, fluorinated surfactants, and other additives such as ethoxylated phosphoric acid esters as stabilizers.

The poly(oxyalkylene) substituted colorant is a liquid or wax-like polymer dye in an aqueous solution which is neither oil- nor organic solvent-soluble. The presence of such polymeric liquid or wax-like dyes within dry erase ink compositions is unique since, as the name implies, the composition must be erasable without streaking and without the need for a cleaning solvent. The utilization of liquid dyes within such a dry erase formulation is thus difficult to accomplish. Examples of such dyes are taught in U.S. Pat. No. 3,157,633 to Kuhn, U.S. Pat. No. 3,449,319 to Kuhn, U.S. Pat. No. 4,091,034 to Kuhn, U.S. Pat. No. 4,102,644 to Hauser et al., U.S. Pat. No. 4,144,028 to Hauser et al., U.S. Pat. No. 4,871,371 to Harris, U.S. Pat. No. 4,877,411 to Hines et al., U.S. Pat. No. 5,043,013 to Kluger et al., U.S. Pat. No. 5,059,244 to King et al., and U.S. Pat. No. 5,620,943 to Brendle, all entirely incorporated herein by reference. Particularly effective within the inventive compositions are dyes having chromophoric groups selected from the group consisting essentially of azo, diazo, disazo, trisazo, diphenylmethane, triphenylmethane, xanthane, nitro, nitroso, acridine, methine, indamine, thiazole, azine, oxazine, and anthraquinone. The preferred polymeric dyes include those containing ethoxylated and propoxylated moieties, with the ethoxylated colorants the most preferred. The degree of alkoxylation of such dyes ranges from 2 to 50 moles per alcohol moiety chain. The inventive compositions comprising these oxyalkylated compounds are easily erasable and removable from most substrates through the use of friction, water, or both.

Specific colorants which are merely preferred, within this invention include the following types:

TABLE 1

TRIPHENYLMETHANE POLYMERIC COLORANTS

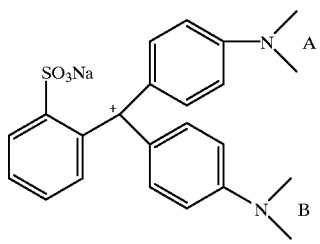

| Number | A | B |
|---|---|---|
| 01 | 27 EO DA | 27 EO DA |
| 02 | 10 EO DA | 10 EO DA |
| 03 | 6 EO DA | 6 EO DA |
| 04 | 4 EO DA | 4 EO DA |
| 05 | 35 EO | 35 EO |
| 06 | 20 EO | 20 EO |
| 07 | 15 EO | 15 EO |
| 08 | 12 EO | 12 EO |
| 09 | 10 EO | 10 EO |
| 10 | 8 EO | 8 EO |
| 11 | 6 EO | 6 EO |
| 12 | 4 EO | 4 EO |

TABLE II

DIAZO POLYMERIC COLORANTS HAVING POLAR GROUPS

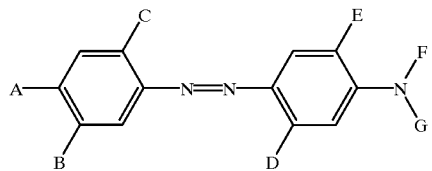

| Number | A | B | C | D | E | FG |
|---|---|---|---|---|---|---|
| 13 | $SO_2N$ 2 EO | H | H | Me | H | 10 EO |
| 14 | COONa | H | H | H | H | 20 EO DA |
| 15 | $SO_2Me$ | H | H | Cl | H | 10 EO DA |
| 16 | $SO_2Me$ | H | Cl | H | H | 20 EO |
| 17 | $SO_3Na$ | H | Cl | H | H | 20 EO |
| 18 | $SO_2NEt2$ | H | OMe | H | H | 10 EO |
| 19 | $SO_2NEt2$ | H | OMe | Me | H | 10 EO |
| 20 | $SO_2NEt2$ | H | OMe | OMe | OMe | 12 EO |
| 21 | $SO_2NEt2$ | H | OMe | OMe | OMe | 20 EO DA |

TABLE III

DIAZO POLYMERIC COLORANTS HAVING POLAR GROUPS (WITH DIFFERENT LINKING ATOMS)

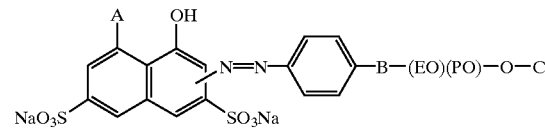

| Number | A | B | C | EO/PO |
|---|---|---|---|---|
| 22 | H | O | H | 30 EO |
| 23 | OH | O | H | 30 EO |
| 24 | H | $SO_2NH$ | Me | 3 PO/19 EO |
| 25 | OH | $SO_2NH$ | Me | 3 PO/19 EO |

Also preferred as colorants are the following in the same numerical order as above:

Number Colorant

27

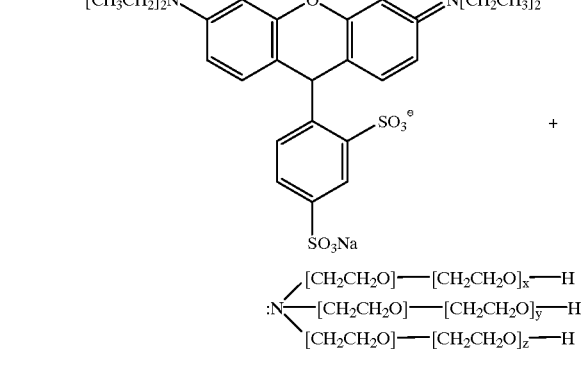

wherein x, y, and z are integers each >0 and the sum of x+y+z is at least 9, preferably at least 12, and, most preferably, at least 20.

A blend of # 10 above and the following:

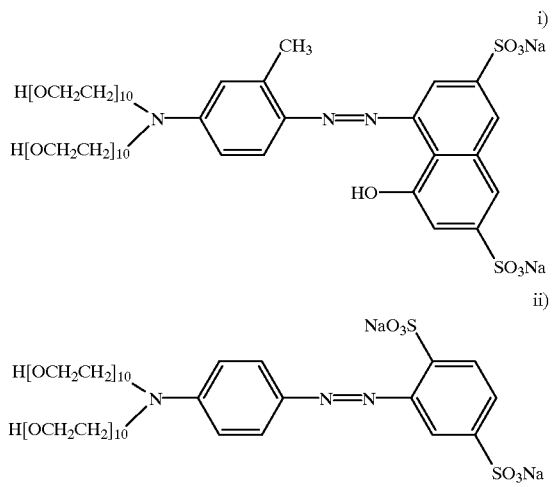

These colorants are, again, merely preferred poly(oxyalkylene) substituted dyes within the inventive composition, and this listing above is not intended to limit the scope of this invention. The colors produced by such polymeric dyes are bright and desirable. The chromophores produce an array of colors, such as blue, red, yellow, orange, scarlet, violet, magenta, and black, all in differing shades. Again, the inventive compositions comprising these dyes are, as noted above, easily removed from white board surfaces, by use of an eraser, and from skin and clothing, by use of water either alone or in a washing process. Furthermore, since these colorants are in liquid (aqueous) form, they do not precipitate out of solution. Their stability within felt-tip capillary action markers is superior to the pigment-containing compositions of the prior art since the presently utilized polymeric colorants do not settle to the bottom of a marker reservoir upon long-term vertical storage. These colorants remain in solution within such markers and thus will only lose colorability upon depletion of the dyes alone and not upon the storage of such markers in any position other than horizontal.

The poly(oxyalkylene) substituted colorant comprises 1–30% by weight of the entire dry erase ink composition, preferably 5–25% by weight, more preferably 8–22% by weight, and most preferably 10–20% by weight. Particular examples below show some exact proportions also.

The volatile solvent vehicle of this composition is one which, when mixed with the aforementioned colorants, dissolves the binder resin and subsequently evaporates quickly from a white board surface. Such a solvent may be, without any intended limitation, any lower aliphatic alcohol, any mixture of such alcohols, a lower aliphatic ketone, such as acetone or methyl ethyl ketone, any mixtures of such ketones, water, or any mixture of these solvents (for instance, aqueous acetone). The preferred alcohols are ethanol, n-propanol, isopropanol, n-butanol, sec-butanol, and mixtures of any two or more such alcohols. Most preferred is ethanol. The vehicle carries the colorant and binder resin such that the entire composition may first be placed into the reservoir of a marker stylus and then be easily transferred to and deposited upon a white board surface. The volatility of the solvent is of utmost importance to effectuate quick evaporation of the vehicle after application to the white board. This leaves the colorant and binder, and any optional additives, remaining on the writing surface. Neither the colorant nor the binder resin are soluble within the listed alcohols, which is, again, unique within this art. The colorant appears to solubilize the binder resin within such alcohols, due to the degree of alkoxylation on the colorant, and the colorant also actually appears to complex with the binder resin and consequently acts as a carrier for the binder resin itself.

The lower aliphatic alcohols and ketones utilized do not have the unpleasant odor of the standard longer chain ketones which are regularly used within prior art white board marker formulations. Without this longer-chain ketone component the present invention thus has a more pleasing aroma. If desired, any standard perfumes, scents, deodorizers, and aroma-producing compounds may be incorporated into the composition to provide improved olfactory characteristics.

Within the dry erase composition of the present invention, these volatile solvents are present from 30–80% by total weight of the composition, preferably 40–70%, more preferably 40–60%, and most preferably 40–52%. The particular examples below show some exact proportions also.

Furthermore, any alcohols utilized may be of any proof and purity; however, absolutely pure alcohols, such as 200 proof ethanol, are preferred. Dehydrated, purified, or both, alcohols tend to evaporate more quickly than those including water and other additives. As a result, the purer the alcohol, the better the result.

The binder resin utilized within this composition is water-soluble and not readily soluble in the other short chain aliphatic alcohols or ketones. Of primary importance to this invention, such a resin must be compatible with both the solvent and the colorant. By compatible, it is meant that such a combination preferably forms a homogeneous mixture with one continuous phase. Also contemplated to meet the definition of compatible is the formation of a microemulsion-type composition with two distinct phases; one continuous and the other discontinuous. This two-phase mixture is possible although the main reason behind this colorant/solvent/resin combination is that the resin is ultimately solubilized and the colorant admixes within the resin for easy application to the writing surface, whereupon the solvent would evaporate quickly.

The amount of binder present is thus extremely important because the colorant must complex with and ultimately solubilize the resin in the solvent. In this manner, as noted above, the colorant acts as a carrier for the resin. The colorant must be able to solubilize the entire resin component within the solvent in such a way that, upon transfer to a writing surface and evaporation of the alcohol, the resin forms a discontinuous film which is impregnated with the colorant and which adheres to the white board, though to a low degree. If too much colorant is, present, the resin would not fully solubilize within the solvent and/or the resultant markings would bleed and streak over the writing surface. If too little colorant is added, either the color will be too faint, or the film will not be uniformly tinted. It is also extremely important to monitor the amount of solvent, particularly when alcohol or alcohols are utilized, in relation to the amount of binder resin. Too little solvent would result in precipitated resin which could clog the marker tip. Too much solvent would result in streaky or faint colors and/or longer evaporation times.

Basically, and preferably, the binder resin is added in powder form to an alcohol solvent and subsequently solubilized when the colorant is introduced. Upon contact with a white board surface, the alcohol evaporates leaving the binder resin as a discontinuous film which includes the polymeric colorants. This film is friable, has low or poor adhesion to a typical white board surface, and redissolves easily in water, in particular in a laundry wash cycle. Most importantly, the colorant adheres more to such a binder resin than it adheres to the writing surface. Upon easy erasure of the friable film from such a writing surface, then, substantially the entire amount of colorant is removed also. This, in effect, results in a dry erase ink composition which will not leave shadowing or ghosting on a white board. This lack of color residue is measurable as a color difference between a clean board and residual non-erasable colorant from ink. Such an improvement in erasability is not obtained solely from short-term application of the dry erase ink composition. Upon long duration setting of the colored film on a white board, the color still would not remain in any appreciable or trace amount on the writing surface after erasure.

The binder resin is any resin which is water-soluble and not readily miscible alone in the volatile solvent vehicle, particularly within an alcohol, which forms a discontinuous, friable film upon a white board surface upon evaporation of an alcohol vehicle, and which is more adhesive to poly (oxyalkylene) substituted colorants than such colorants are to white board surfaces. Preferred examples include polyvinylpyrrolidones, polyvinylpyrrolidone vinyl acetates, polyacrylates, polyvinylacetals, polyvinyl acetates, or a product of polyvinyl acetal with acetaldehyde, butyraldehyde, or both. Preferred is polyvinylpyrrolidone.

The preferred polyvinylpyrrolidone, having a preferred average molecular weight of 40,000–80,000, is added to a solution of volatile alcohol in powder form. The colorant then solubilizes the binder resin within the alcohol, as noted above.

The binder resin comprises 8–20% by total weight of the composition, preferably 10–18% by weight, more preferably 11–15%, and most preferably 11–13%. Particular examples below show some exact proportions.

Also contemplated as additives within the inventive dry erase ink composition, as noted, are well known release agents. These components facilitate the removal of the binder resin film, and, consequently, the erasure of the polymeric colorant from the writing surface. Preferred examples of such release agents include bis(2-ethylhexyl) sebacate, ester products of condensation reactions of polyhydric alcohols and carboxylic acids, carboxylated polyoxyalkylene alkyl ethers and their corresponding fatty alcohol esters, butyl stearate, isopropyl(isooctyl)myristate, isopropyl(isooctadecyl)palmitate, polyoxyethylene-polyoxypropylene cetyl ether, polyoxyethylene polyoxypropylene decyltetradecyl ether, polyoxyethylene polyoxypropylene monoalkyl ethers, and any mixtures thereof of these agents. Most preferred is bis(2-ethylhexyl)sebacate. This list is not exhaustive as any standard dry erase release agent would be suitable within this inventive composition. The release agent may comprise 0–12% by weight of the total composition, preferably 5–10% by weight, and most preferably 9% by weight.

Numerous surfactants, both fluorinated and non-fluorinated, may also be introduced into the inventive composition to aid in adhering the film, colorant, or both, to a writing surface, as well as to facilitate the removal of the film and colorant therefrom. The surfactants utilized will adjust the surface tension of the composition when transferred to a white board. Some preferred non-fluorinated surfactants or surfactant-type agents include cationic amide oxides, esters of ethoxylated polyols, aminosilicone emulsions, and any mixtures thereof. The preferred non-fluorinated surfactant is a cationic amide oxide, in particular a dimethylaminopropyl dodecanamide oxide aqueous, cationic, non-rewetting surfactant solution available from Sequa Chemicals, Inc., under the trade name of Mykon NRW-3™. It has been found that the presence of about 1% by weight of the total composition of this cationic amide oxide as the sole surfactant component of the inventive composition provides superior benefits in colorations. These non-fluorinated types aid in the spreading and contacting of the ink-containing film to the white board surface.

Any well known fluorinated surfactant may be utilized also. This labeling of fluorinated and non-fluorinated surfactants is necessary due to the importance of sequential introductions of materials by the preferred method of making this composition, which is discussed in further detail, below. The non-fluorinated surfactant acts as an anti-wetting and anti-sticking agent for the discontinuous film which facilitates the removal of such a film from the writing surface. Generally, any fluorinated surfactant available from 3M Company which comprises fluorinated aliphatic oxyethylene adducts having from 4 to 18 carbons, and which may also comprise alkoxylated species, are contemplated within this invention.

The non-fluorinated surfactants may comprise 0–9% by weight of the entire composition, preferably 0.4–7% by weight, more preferably 0.5–7% by weight, and most preferably 1% by weight. The fluorinated surfactant may comprise 0–6% by weight of the total composition, preferably 0.1–5%, and most preferably 0.5–5% by weight. Thus, the entire surfactant component within the inventive composition may comprise 0–15% by weight of the total composition, preferably 0.5–12% by weight, more preferably 1–12% by weight, and most preferably 1% by weight.

Other standard additives, such as stabilizers, are contemplated within the inventive composition, also. Such stabilizers include alkoxylated phosphoric acid esters and mixtures thereof comprising 0–4%, preferably 4%, by weight of the total composition.

The dry erase ink composition may be prepared by any well known method; however, it has been found that optimum results are obtained when the following sequence is utilized:

1) volatile solvent vehicle;

2) binder resin:

3) optional fluorinated surfactant;

4) optional non-fluorinated surfactant or surfactants, including the preferred cationic amide oxide;

5) optional release agent; and 6) poly(oxyalkylene) substituted colorant.

The initial formation of the solvent/resin mixture followed by the ultimate addition of the polymeric colorant provides the best results in coloration, erasability, writability, and stability when utilized in a dry erase marker. The examples below provide further guidance for the ordinary practitioner in this art as well as the preferred composition and method of making the composition of this invention.

PREFERRED EMBODIMENTS OF THE INVENTION

The preferred dry erase ink formulations are provided in the TABLE below. The amounts of ingredients in the following ink compositions are expressed as per cent by weight of the total composition.

EXPERIMENTAL TABLE
COLORANTS Examples 1–4

| INGREDIENT | Example 1 #10 (from Table I) | Example 2 #28 (from above) | Example 3 #13 (from Table II) | Example 4 #27 (from above) |
|---|---|---|---|---|
| Ethanol, 200 proof | 50.2 | 43.0 | 51.0 | 43.0 |
| PVP K-30[1] | 12.4 | 12.0 | 12.0 | 12.0 |
| Fluoroaliphatic ($C_4$–$C_8$ mixtures) Oxyethylene Adduct Surfactant | 5.0 | 5.0 | 5.0 | 5.0 |
| Alkoxylated phosphoric acid ester | 4.0 | 4.0 | 4.0 | 4.0 |
| Tween 60 ®[2] | 1.0 | 1.5 | 1.4 | 1.4 |
| Viscosoft ™ VP 25395[3] | 5.0 | 4.5 | 4.6 | 4.6 |
| Mykon NRW-3 ™ | 1.0 | 1.0 | 1.0 | 1.0 |
| bis(2-ethylhexyl)sebacate | 9.0 | 9.0 | 9.0 | 9.0 |
| Colorant | 12.4 | 20.0 | 12.0 | 20.0 |
| TOTAL | 100.0 | 100.0 | 100.0 | 100.0 |

[1]PVP K-30: International Specialty Products 2-pyrrolidone, 1-ethylenyl-homopolymer.
[2]Tween ® 60: ICI Americas Inc. poly(oxyethylene) 20 sorbitan monostearate.
[3]Viscosoft ™ VP 2539: Boehme Filatex Inc. proprietary aminosilicone and alcohol ethoxylate emulsion.

[1]PVP K-30: International Specialty Products 2-pyrrolidone, 1-ethylenyl-homopolymer.

[2]Tween® 60: ICI Americas Inc. poly(oxyethylene) 20 sorbitan monostearate.

[3]Viscosoft™ VP 2539: Boehme Filatex Inc. proprietary aminosilicone and alcohol ethoxylate emulsion.

The compositions produced in Examples 1–4, above, were introduced into reservoirs of marker stylus assemblies having felt tips after which the assemblies were sealed. The markers then were used to write on a white board having an enamel surface. The sample writings were then tested for their writability and erasability on the white boards as well as their washability from skin and fabrics. The white board writings produced by these ink compositions were allowed to remain on the white board for 5 minutes at room temperature. The writings obtained were easily readable, brightly colored, and undiminishing in their color strength over the elapsed time. The writings were then dry erased utilizing a standard dry eraser and were found to be completely removed from the writing surface with no ghosting or shadowing detected. These ink formulations were also applied to a person's skin as well as to fabric samples, particularly cotton and polyester/cotton blends. The inks were easily washed from the person's skin and each fabric leaving no trace of color at all on any of those substrates.

Comparative examples were also prepared and tested in the same manner as above. In particular, the binder resin exemplified within the Nakanishi reference noted above was tested with and without the presently preferred polyvinylpyrrolidone binder resin.

COMPARATIVE EXAMPLES

| INGREDIENT | Example 1 | Example 2 |
|---|---|---|
| Ethanol, 200 proof | 74.5 | 49.0 |
| 2-Propanol | — | 32.5 |
| Tween ™ 60 | 4.0 | 11.5 |
| Fluorocarbon | 1.0 | — |
| Polyvinylbutyral | 2.5 | 4.0 |

-continued

COMPARATIVE EXAMPLES

| INGREDIENT | Example 1 | Example 2 |
|---|---|---|
| Polyvinylpyrrolidone co-acrylic acid | 15.0 | — |
| Colorant-#10 from Table I above | 3.0 | 3.0 |
| TOTAL | 100.0 | 100.0 |

Performance results are poor for both of these comparative dry erase ink compositions when tested for the same results and under the same conditions as for Examples 1–4 within the Experimental Table, above. The colorations were difficult to remove completely from the white board surface, and, in fact, could not be completely removed. Neither could these compositions be removed readily from skin or fabrics. The utilization of a polyvinylbutyral resin either alone or in combination with a polypyrrolidone derivative thus showed deleterious effects upon the performance of the polymeric colorants of the inventive composition.

There are, of course, many alternative embodiments and modifications of the present invention which are to be included within the spirit and scope of the following claims.

What is claimed is:

1. A dry erase ink composition for use on a white board surface comprising at least one poly(oxyalkylene) substituted colorant, wherein said colorant is present in liquid or waxy form;
   at least one volatile solvent vehicle;
   at least one binder resin, which is compatible with both the colorant and the volatile solvent vehicle, and which binds to the white board surface as a friable discontinuous film upon evaporation of the volatile solvent vehicle, selected from the group consisting of polyvinylpyrrolidones, polyvinylpyrrolidone vinyl acetates, polyacrylates, polyvinyl acetates, a product of polyvinyl acetal with acetaldehyde, butyraldehyde, or both, and any mixtures thereof; and,
   as optional additives, one or more release agents, one or more surfactants, and one or more stabilizers;
   wherein said binder resin is present in an amount of from about 8 to about 20% by weight of the total ink composition.

2. The composition of claim 1 wherein the poly(oxyalkylene) substituted colorant is a polymeric dye having from 2 to 50 moles of oxyethylene or oxypropylene groups per alcohol moiety chain; and wherein the volatile solvent vehicle is selected from the group consisting of alcohols, lower aliphatic ketones, water, and any mixtures of alcohols, lower aliphatic ketones, and water, thereof.

3. The composition of claim 2 wherein the poly(oxyalkylene) substituted colorant is an ethoxylated polymeric dye; and wherein the volatile solvent vehicle is at least one alcohol selected from the group consisting of ethanol, n-propanol, isopropanol, n-butanol, sec-butanol, and any mixtures thereof.

4. The composition of claim 3 wherein the poly(oxyalkylene) substituted colorant comprises a chromophore selected from the group consisting of azo, diazo, disazo, trisazo, diphenylmethane, triphenylmethane, xanthane, nitro, nitroso, methine, azine, oxazine, indamine, acridine, thiazole, and anthraquinone;

wherein the volatile solvent vehicle is at least ethanol; and wherein the binder resin is a polyvinylpyrrolidone.

5. A white board marker comprising the dry erase ink composition of claim 4.

6. The composition of claim 3 wherein the volatile solvent vehicle is at least an alcohol which is pure, dehydrated, or both.

7. A white board marker comprising the dry erase ink composition of claim 6.

8. The composition of claim 1 which further comprises a release agent.

9. The composition of claim 8 wherein the release agent is bis(2-ethylhexyl)sebacate.

10. A white board marker comprising the dry erase ink composition of claim 8.

11. The composition of claim 1 which further comprises one or more surfactants.

12. The composition of claim 11 wherein the surfactant is a cationic amide oxide.

13. A white board marker comprising the dry erase ink composition of claim 12.

14. The composition of claim 1 comprising

1–30% of at least one of said poly(oxyalkylene) substituted colorant;
30–80% of at least one or more volatile solvent vehicle
0–12% of at least one release agent;
0–15% of at least one surfactant; and
0–4% of at least one stabilizer, wherein all the proportions are expressed in weight percentages of the total composition.

15. The composition of claim 14 comprising

5–20% of at least one of said poly(oxyalkylene) substituted colorant;
40–70% of at least one volatile solvent vehicle; and
10–18% of at least one binder resin, wherein all the proportions are expressed in weight percentages of the total composition.

16. The composition of claim 15 further comprising 1% by weight of the total composition of a cationic amide oxide surfactant.

17. A white board marker comprising the dry erase ink composition of claim 16.

18. A white board marker comprising the dry erase ink composition of claim 15.

19. The composition of claim 14 comprising

8–22% of at least one poly(oxyalkylene) substituted colorant;
40–60% of at least one of said volatile solvent vehicle; and
11–15% of at least one of said binder resin, wherein all the proportions are expressed in weight percentages of the total composition.

20. A white board marker comprising the dry erase ink composition of claim 19.

21. The composition of claim 14 comprising

10–20% of at least one poly(oxyalkylene) substituted colorant;
40–52% of at least one volatile solvent vehicle; and
11–13% of at least one binder resin, wherein all the proportions are expressed in weight percentages of the total composition.

22. A white board marker comprising the dry erase ink composition of claim 21.

23. The composition of claim 14 further comprising

5–10% of at least one release agent;
0.5–12% of at least one surfactant; and
4% of at least one stabilizer, wherein all the proportions are expressed in weight percentages of the total composition.

24. A white board marker comprising the dry erase ink composition of claim 23.

25. A white board marker comprising the dry erase ink composition of claim 14.

26. A white board marker comprising the dry erase ink composition of claim 1.

27. A method of producing a dry erase ink composition, comprising a poly(oxyalkylene) substituted colorant wherein said colorant is present in liquid or waxy form, for use on a white board surface comprising the sequential steps of:

(a) providing at least one volatile solvent vehicle;
(b) introducing from about 8 to about 20% by total weight of the composition of at least one binder resin into the solvent vehicle, wherein the binder resin is compatible with both the poly(oxyalkylene) substituted colorant and the solvent vehicle, and which binds to the white board surface as a friable film upon evaporation of the solvent vehicle, said resin binder selected from the group consisting of polyvinylpyrrolidones, polyvinylpyrrolidone vinyl acetates, polyacrylates, polyvinyl acetates, a product of polyvinyl acetal with acetaldehyde, butyraldehyde, or both, and any mixtures thereof;
(c) optionally adding at least one fluorinated surfactant;
(d) optionally adding at least one stabilizer;
(e) optionally adding at least one non-fluorinated surfactant;
(f) optionally adding at least one release agent; and
(g) adding the poly(oxyalkylene) substituted colorant.

28. The method of claim 27 wherein the volatile solvent vehicle of step (a) is selected from the group consisting of alcohols or mixtures thereof, lower aliphatic ketones or mixtures thereof, water, or any mixtures or alcohols, ketones, and water, thereof; and the poly(oxyalkylene) substituted colorant of step (g) is a polymeric dye having from 2 to, 50 moles of oxyethylene or oxypropylene groups per alcohol moiety chain.

29. A white board marker comprising the dry erase ink composition produced by the method of claim 28.

30. The method of claim 27 wherein
the volatile solvent vehicle of step (a) is at least an alcohol which is selected from the group consisting of ethanol, n-propanol, isopropanol, n-butanol, sec-butanol, and mixtures thereof; and
the poly(oxyalkylene) substituted colorant of step (g) is an ethoxylated polymeric dye.

31. A white board marker comprising the dry erase ink composition produced by the method of claim 30.

32. The method of claim 27 wherein
the volatile solvent vehicle of step (a) is at least ethanol;
the binder resin of step (b) is polyvinylpyrrolidone; and
the poly(oxyalkylene) substituted colorant of step (g) comprises a chromophore selected from the group consisting of azo, diazo, disazo, trisazo, diphenylmethane, triphenylmethane, xanthane, nitro, nitroso, methine, azine, oxazine, indamine, acridine, thiazole, and anthraquinone.

33. The composition of claim 32 wherein the volatile solvent vehicle is at least an alcohol which is pure, dehydrated, or both.

34. A white board marker comprising the dry erase ink composition produced by the method of claim 33.

35. The method of claim 32 wherein step (e) is present and the non-fluorinated surfactant of step (e) is at least one cationic amide oxide.

36. The method of claim 35 wherein step (e) involves the addition of more than one non-fluorinated surfactants.

37. A white board marker comprising the dry erase ink composition produced by the method of claim 35.

38. The method of claim 32 wherein all the steps (a) through (g) are present.

39. The method of claim 38 wherein the added non-fluorinated surfactants of step (e) are selected from the group consisting of at least one ester of an ethoxylated polyol, at least one aminosilicone emulsion, and at least one cationic amide oxide, each added in the order listed.

40. A white board marker comprising the dry erase ink composition produced by the method of claim 39.

41. A white board marker comprising the dry erase ink composition produced by the method of claim 38.

42. A white board marker comprising the dry erase ink composition produced by the method of claim 32.

43. The method of claim 27 wherein
the volatile solvent vehicle of step (a) comprises 30–80%;
the fluorinated surfactant of step (c) comprises 0–6%;
the stabilizer of step (d) comprises 0–4%;
the non-fluorinated surfactant or surfactants of step (e) comprises 0–9%;
the release agent of step (f) comprises 0–12%; and
the poly(oxyalkylene) substituted colorant of step (g) comprises 1–30%, wherein all the proportions are expressed in weight percentages of the total composition.

44. The method of claim 43 wherein
the volatile solvent vehicle of step (a) comprises 40–70%;
the binder resin of step (b) comprises 10–18%; and
the poly(oxyalkylene) substituted colorant of step (g) comprises 5–20%, wherein all the proportions are expressed in weight percentages of the total composition.

45. A white board marker comprising the dry erase ink composition produced by the method of claim 44.

46. The method of claim 43 wherein
the volatile solvent vehicle of step (a) comprises 40–60%;
the binder resin of step (b) comprises 11–15%; and
the poly(oxyalkylene) substituted colorant of step (g) comprises 8–22%, wherein all the proportions are expressed in weight percentages of the total composition.

47. The method of claim 46 wherein
the non-fluorinated surfactant of step (e) is at least one cationic amide oxide which comprises 1% by weight of the total weight of the composition.

48. A white board marker comprising the dry erase ink composition produced by the method of claim 47.

49. A white board marker comprising the dry erase ink composition produced by the method of claim 46.

50. The method of claim 43 wherein
the volatile solvent vehicle of step (a) comprises 40–52%;
the binder resin of step (b) comprises 11–13%; and
the poly(oxyalkylene) substituted colorant of step (g) comprises 10–20%, wherein all the proportions are expressed in weight percentages of the total composition.

51. A white board marker comprising the dry erase ink composition produced by the method of claim 50.

52. The method of claim 43 wherein
the fluorinated surfactant of step (c) comprises 0.5–5%;
the stabilizer of step (d) comprises 4%;
the non-fluorinated surfactant or surfactants of step (e) comprises 0.5–7%; and
the release agent of step (f) comprises 5–10%, wherein all the proportions are expressed in weight percentages of the total composition.

53. A white board marker comprising the dry erase ink composition produced by the method of claim 52.

54. A white board marker comprising the dry erase ink composition produced by the method of claim 43.

55. A white board marker comprising the dry erase ink composition produced by the method of claim 27.

* * * * *